(12) United States Patent
Matsumoto et al.

(10) Patent No.: US 7,817,670 B2
(45) Date of Patent: Oct. 19, 2010

(54) TRANSMISSION APPARATUS AND TRANSMISSION METHOD

(75) Inventors: Kunihiko Matsumoto, Yokohama (JP); Yuji Tarui, Kawasaki (JP); Hiromitsu Horie, Kawasaki (JP); Ryuichi Yoda, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1069 days.

(21) Appl. No.: 10/923,750

(22) Filed: Aug. 24, 2004

(65) Prior Publication Data

US 2005/0195850 A1  Sep. 8, 2005

(30) Foreign Application Priority Data

Mar. 2, 2004  (JP) .............................. 2004-057845

(51) Int. Cl.
 *H04J 3/00*  (2006.01)
(52) U.S. Cl. .................. 370/476; 370/300; 370/428; 370/471; 370/473; 370/474; 370/503; 709/236
(58) Field of Classification Search .......... 370/299, 370/236, 389, 428, 471, 474, 503, 473; 709/236
 See application file for complete search history.

(56) References Cited

U.S. PATENT DOCUMENTS

| | | | | |
|---|---|---|---|---|
| 5,274,807 A | * | 12/1993 | Hoshen et al. ............... 707/205 |
| 5,298,992 A | * | 3/1994 | Pietras et al. ........... 375/240.12 |
| 5,450,071 A | * | 9/1995 | DeLuca et al. ............. 340/7.46 |
| 5,537,409 A | * | 7/1996 | Moriyama et al. .......... 370/471 |
| 5,544,176 A | * | 8/1996 | Fujii et al. ................... 714/769 |
| 5,579,183 A | * | 11/1996 | Van Gestel et al. ............ 360/48 |
| 5,701,302 A | * | 12/1997 | Geiger ......................... 370/521 |
| 5,751,704 A | * | 5/1998 | Kostic et al. ................. 370/335 |
| 5,754,553 A | * | 5/1998 | Shimoda ..................... 370/471 |
| 5,933,464 A | * | 8/1999 | Zogg ............................ 375/343 |
| 6,477,181 B1 | | 11/2002 | Fujimori et al. |
| 6,704,793 B1 | * | 3/2004 | Oh et al. ..................... 709/236 |

(Continued)

FOREIGN PATENT DOCUMENTS

| | | |
|---|---|---|
| JP | 2001-86089 | 3/2001 |
| WO | 00/14952 | 3/2000 |

OTHER PUBLICATIONS

Office Action issued in corresponding Japanese Patent Application No. 2004-057845, mailed on Aug. 21, 2007.

*Primary Examiner*—Ricky Ngo
*Assistant Examiner*—Luat Phung
(74) *Attorney, Agent, or Firm*—Staas & Halsey LLP (57) ABSTRACT

In a transmitting end, positional information indicating positions of data packets to be reproduced in a receiving end among data packets in an inputted bit stream is generated with a plurality of data packets as one unit, and generated one piece of positional information is given to a plurality of data packets, and the data packets with the positional information are transmitted. In a receiving end, reproduction timings are controlled based on the received positional information, and the received data packets are reproduced. As a result, even if a time interval of the data packets to be reproduced in the receiving end in the bit stream inputted into the transmitting end doesn't have a fixed period, the data packets can be reproduced in the receiving end in the same timing as in the transmitting end by only giving one piece of positional information to the plurality of data packets.

19 Claims, 10 Drawing Sheets

U.S. PATENT DOCUMENTS 6,778,501 B1 * 8/2004 Malmgren et al. .......... 370/236
7,289,535 B2 * 10/2007 Odman ....................... 370/473
2002/0191643 A1 * 12/2002 Yun et al. ................... 370/474
2003/0043857 A1 * 3/2003 Takagi et al. ................ 370/503

* cited by examiner

FIG. 2

| 3 | | 2 | | 1 | | 0 | |
|---|---|---|---|---|---|---|---|
| 31 30 29 | 28 27 26 25 24 23 22 21 20 19 18 17 | 16 15 14 13 12 | 11 10 9 8 7 6 5 4 3 2 1 0 |
| TSwidth [2:0] | place [11:0] | blank | state [11:0] |

(place=0×444h)

FIG. 4A

(place=0×924h)

FIG. 4B (place=0×92h)

FIG. 4C (place=0×9h)

TRANSMISSION APPARATUS AND TRANSMISSION METHOD

CROSS-REFERENCE TO RELATED APPLICATIONS

This application is based upon and claims the benefit of priority from the prior Japanese Patent Application No. 2004-057845, filed on Mar. 2, 2004, the entire contents of which are incorporated herein by reference.

BACKGROUND OF THE INVENTION

1. Field of the Invention

The present invention relates to a transmission apparatus and a transmission method, and is particularly favorable for use in a transmission apparatus for transferring data to be transmitted and received by packet communication.

2. Description of the Related Art

Conventionally, in packet communication, time information (hereinafter, called "time stamp") is given to each packet to be transferred, and packet transfer is carried out from a transmitting end to a receiving end, in consideration of handling of packet loss in a transmission line and transmission delay. In the receiving end, the packets are read out and reproduced in accordance with the time stamp given to the packets, and thereby intervals between the packets at the time of transmission are reproduced (for example, see Patent Document 1).

However, when the time stamp is given to each packet to be transmitted, if real time date (bit stream), which is demanded of real time property, such as voice date and image data is transferred by packet communication, the time stamp amount becomes overhead, which results in reduction in transmission efficiency. For each packet, processing of giving the time stamp is performed in the transmitting end and readout and reproduction processing is performed in the receiving end, thus causing reduction in processing speed and bloating of the circuit scale.

As one of the methods for solving the above-described problems, there is proposed a method for reducing a transmission and reception data amount per one data packet by bringing a plurality of time-series data packets together as one group, giving a time stamp for each group and transferring them (for example, see Patent Document 2). In the method proposed in the Patent Document 2, in the transmitting end, one of the data packets in the group is specified and given the time stamp of the data packet, and the group is transferred to the receiving end. In the receiving end, the readout timing of the data packets in the group is controlled and reproduced based on the given time stamp.

However, in the method proposed in the Patent Document 2, the readout timing is controlled by estimating the periods of the data packets based on the given time stamp and the number of data packets included in the group, and therefore the data packets which are reproduced in the receiving end have to have time-series arrangement in a certain fixed period in the transmitting end. Accordingly, the aforementioned transmission method cannot be applied to the case in which the data packets to be transferred exist at arbitrary time intervals.

[Patent Document 1] Translated National Publication of Patent Application No. 2002-524981

[Patent Document 2] Japanese Patent Application Laid-open No. Hei9-298558

SUMMARY OF THE INVENTION

The present invention has object to reduce a data amount per one data packet in transfer of data packets and to make it possible to reproduce the data packets in a receiving end in the same timing as in the transmitting end, irrespective of the time intervals of the data packets to be transferred.

In a transmission apparatus of the present invention, at the side of transmitting data, positional information indicating positions of data packets to be reproduced in a receiving end among data packets in an inputted bit stream, is generated with a plurality of the data packets as one unit, one positional information packet having the generated positional information is given to the plurality of data packets, and the plurality of data packets with the positional information packet are transmitted.

In the transmission apparatus of the present invention, at the side receiving the data, the positional information packet having the positional information, and the data packets transmitted with the positional information packet are received, and the reproduction timings of the received data packets are controlled based on the received positional information.

According to the present invention, even if the time intervals of the data packets reproduced in the receiving end in the bit stream inputted into the transmitting end don't have a fixed period, the data packets can be reproduced in the same timing in the receiving end as in the transmitting end by giving one piece of positional information to a plurality of data packets and reading out the data packets by controlling the reproduction timing based on the positional information.

DETAILED DESCRIPTION OF THE PREFERRED EMBODIMENTS

An embodiment of the present invention will be explained based on the drawings.

In the embodiment of the present invention, data packets in a bit stream are expressed (managed) by the positions. In the transmitting end, positional information indicating the positions of the data packets to be reproduced in the receiving end is given to every plurality of data packets, and the data packets with the positional information are transferred. In the receiving end, the data packets are read out and reproduced based on the positional information.

The positional information, and data packet transfer using the positional information in this embodiment will be explained first, and a transmission apparatus according to this embodiment will be explained next.

In the following explanation, a time period corresponding to a plurality of successive packets, which are given one piece of positional information, namely, a generation unit of the positional information, is called a position window. The size of the position window is expressed by using the number of packets included in the position window.

Figure 1A:
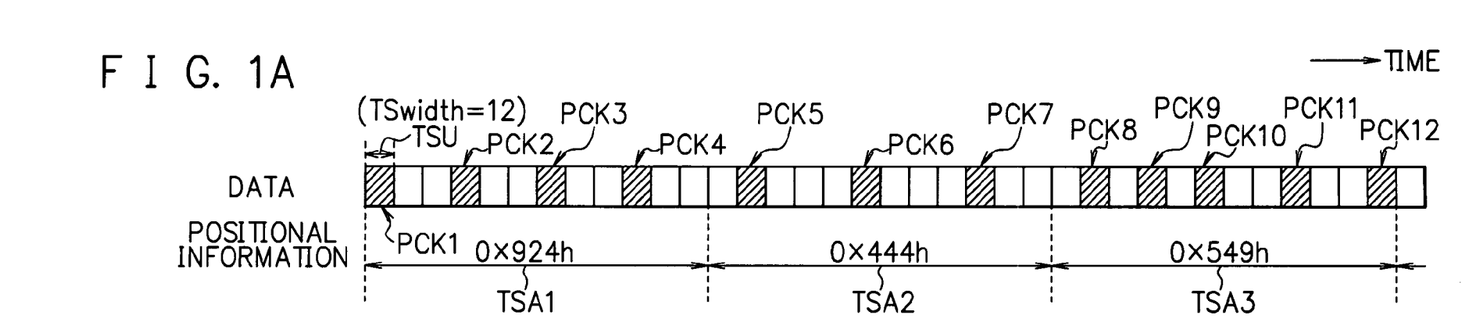
FIGS. 1A to 1C are diagrams for explaining positional information in an embodiment of the present invention.
Figure 1B:
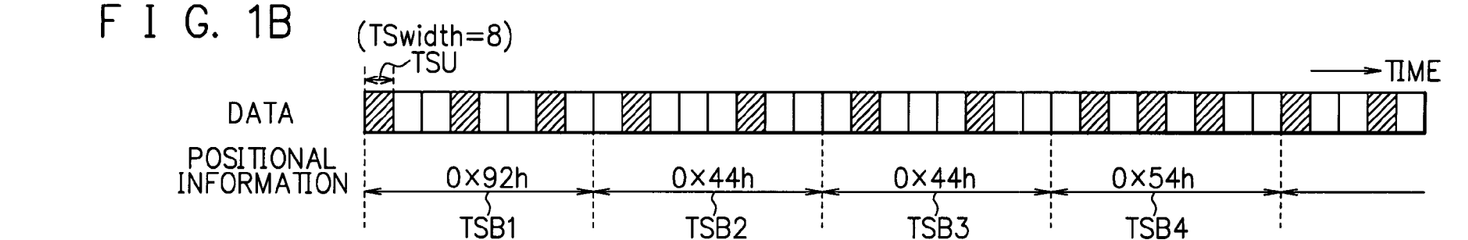
Figure 1C:
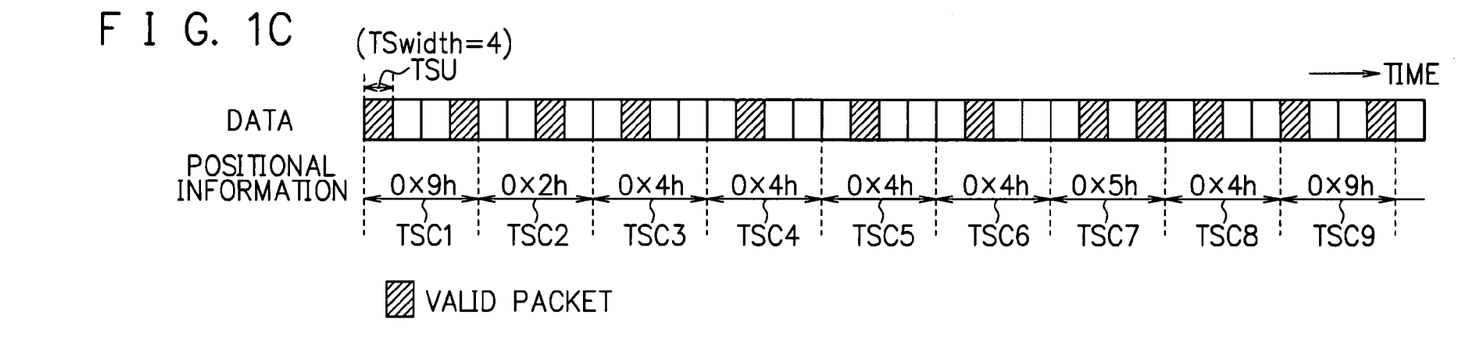

FIGS. 1A to 1C are diagrams for explaining the positional information in this embodiment.

In FIGS. 1A to 1C, the data packets (bit stream) are intended to represent a TS (Transport Stream) in the MPEG (Moving Picture Experts Group) standards as one example and shown. Each of the squares (having time width of a time period TSU) in the data shown in FIGS. 1A to 1C shows one TS packet (data packet) of a packet length of 188 bytes, and the valid packets (data packets are reproduced in the receiving end) are given hatching.

A valid packet PCKi (i=natural numbers from 1 to 12, and reference numerals and symbols are given only to FIG. 1A, but the same reference numerals and symbols are also applied to FIG. 1B and FIG. 1C) is a data packet of a bit stream corresponding to a specified selected channel. The valid packet PCKi includes SI (Service Information) data which is control data for indicating an EPG (Electronic Program Guide) and the like other than voice data and image data. In the data communication in this embodiment, there is the case in which only the valid packets are transferred in accordance with the reproduction rate of the bit stream and the transfer rate in the transmission line, and there is the case in which both the valid packets and invalid packets are transferred.

FIG. 1A is a diagram showing the case in which the size of the position window is set at 12 data packets. In FIG. 1A, each of time periods TSA1, TSA2, . . . is one position window, and corresponds to the time period of twelve data packets.

As shown in FIG. 1A, among the twelve data packets in the time period (position window) TSA1, the first, fourth, seventh and tenth data packets PCK1, PCK2, PCK3 and PCK4 from the earliest in point of time are the valid packets. Here, when the valid packets PCK1, PCK2, PCK3 and PCK4 are expressed by "1", and the other data packets (invalid packets) are expressed by "0" in binary numeral, the data packets in the period TSA1 are expressed by "1001 0010 0100" (0x924h: hexadecimal numeral), and this is the positional information. Namely, the positional information indicates the positions of the valid packets in the position window.

Similarly, in the time period TSA2, the second, sixth and tenth data packets PCK5, PCK6 and PCK7 are the valid packets, and therefore the positional information is "0100 0100 0100" (0x444h). In the time period TSA3, the second, fourth, sixth, ninth and twelfth data packets PCK8, PCK9, PCK10, PCK11 and PCK12 are the valid packets, and therefore the positional information is "0101 0100 1001" (0x549h).

FIG. 1B is a diagram showing the case in which the size of the position window is set at 8 data packets, and FIG. 1C is a diagram showing the case in which the size of the position window is set at 4 data packets. FIG. 1B and FIG. 1C differ from what is shown in FIG. 1A in the points that the position windows which are the generation units of the positional information are set as the time periods TSB1, TSB2, . . . each of the eight data packets, and as the periods TSC1, TSC2, . . . each of the four data packets. The principle of generation of the positional information is the same, thus omitting the explanation.

Here, it is more efficient to generate the positional information by a number of data packets (by making the size of the position window large). However, when the packet loss occurs at the time of transfer, it is not always suitable to generate the positional information by simply making the size of the position window large, if it is considered that the retransmission processing or the like of the data packets is performed.

Accordingly, the transmission apparatus in this embodiment which will be described later makes it possible to change the size of the position window to a twelve data packets unit, an eight data packets unit, and a four data packets unit as shown in, for example, FIGS. 1A to 1C, and makes it possible to select a suitable size of the position window in accordance with the transmission quality and the like.

Figure 2:
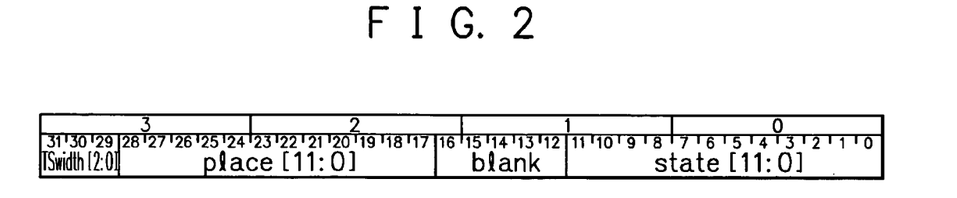
FIG. 2 is a diagram showing one example of a format of a positional information packet.

FIG. 2 is a diagram showing one example of a format of the positional information packet given to every plurality of data packets. As shown in FIG. 2, the positional information packet has a TSwidth field, a place field, a blank field, and a state field.

The TSwidth field is a field indicating size information showing a size (width) of the position window. In this embodiment, the TSwidth field is constituted of three bits. In the TSwidth field, different values are indicated in accordance with the position window sizes of the four data packets unit, the eight data packets unit and the twelve data packets unit. By providing this TSwidth field, it is possible to easily synchronize the position window sizes between the transmitting end and the receiving end.

The place field is a field indicating the positional information. Each bit of the place field corresponds to each data packet seen in the position window unit, and indicates whether the corresponding data packet is the valid packet or the invalid packet. The place field is provided to conform to the maximum position window size and is of 12 bits in this embodiment. When the position window size is not the maximum (for example, four data packets or eight data packets), it is suitable to ignore (Don't care) the redundant bits in the place field.

The blank field is a field indicating blank information showing an interval (gap) between the valid packets. If the gap between the valid packets is large in the bit stream, the positional information packet has to be issued even if the valid packet does not exist in the position window, and the processing efficiency and transmission efficiency are reduced. Thus, when the valid packet does not exist for a while, namely, the gap between the valid packets is larger than a predetermined threshold value, in the transmitting end, the gap between the valid packets (for example, the valid packet does not exist before a certain number of data packets, and the like) is indicated in the blank field as the blank information, thereby preventing issue of useless positional information packets to enhance the efficiency of the internal processing and the like.

Meanwhile, in the receiving end, the gap between the valid packets is regenerated and reproduced by analyzing the blank information. The threshold value for determining whether the blank information is used or not can be optionally changed.

The blank field indicates the number of data packets itself, but the number of data packets is encoded and the corresponding code may be indicated. As for the blank information indicated in the blank field, when the tolerance of the jitter is exact depending on the system, for example, the gap between the valid packets may be indicated by the number of clocks synchronous or asynchronous with the data packets may be indicated. Further, the gap between the valid packets may be indicated by the combination of the number of data packets and the number of clocks.

The state field is a field for indicating status information transferred synchronously with the data packets, more specifically, fault information (error status information) of each packet. Each bit of the state field corresponds to each data packet seen in the position window unit, and indicates whether the corresponding data packet is an error or not. In the receiving end, it is possible to input the status information together with the received data packets into a decoder or the like, perform processing of disposal, retransmission demand and the like of the data packets corresponding to the information, and display the status information corresponding to the data packets. The state field is provided to correspond to the maximum position window size as the place field, and when the position window size is not the maximum, it is suitable to ignore redundant bits in the state field.

The format of the positional information packet shown in FIG. 2 is only an example, and the format is not limited to this. The format of the positional information packet can be changed properly in accordance with the position window size and the number of bits or the like of the positional information, and it may be of 64 bits, for example.

Data constitution on performing data communication by using the positional information packet is shown in FIGS. 3A and 3B, and FIGS. 4A to 4C. In FIGS. 3A and 3B and FIGS. 4A to 4C, the constitution of the MAC (Media Access Control) data when data communication is performed in accordance with the IEEE802.11 standards is shown as one example, only the MAC frame main body is shown without showing the MAC header and FCS (Frame Check Sequence) frame.

Figure 3A:
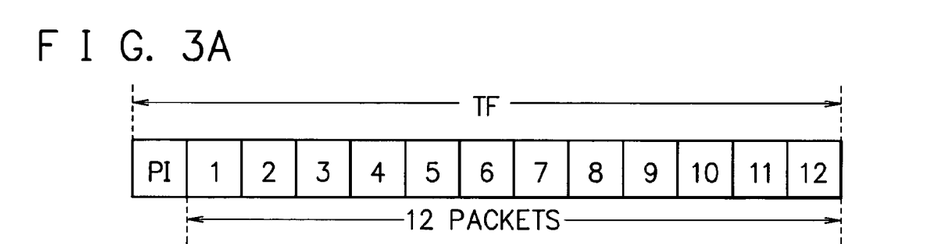
FIGS. 3A and 3B are diagrams showing data constitution examples at a time of data communication in the embodiment.
Figure 3B:
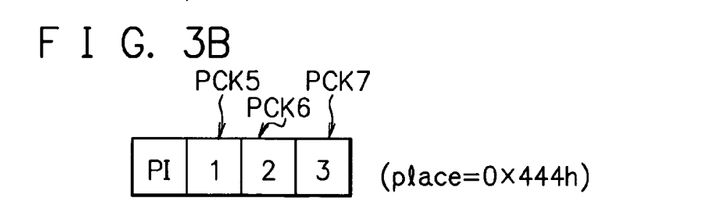

FIGS. 3A and 3B are the diagrams showing data constitution examples in the case in which only valid packets are transferred in data communication.

As shown in FIG. 3A, a transmission frame TF at the time of transferring the data from the transmitting end to receiving end is constituted of a positional information packet PI and valid packets (the number of valid packets is optionally selected from 0 to 12). When the invalid packets are not transferred and only the valid packets are transferred like this, the transmission efficiency can be remarkably enhanced, and this is very effective when, for example, the bandwidth of the transmission line (communication medium) is limited.

For example, the transmission frame TF when the data packets in the time period TSA2 shown in FIG. 1A are transmitted and received is constituted of the positional information packet PI and the valid packets PCK5, PCK6 and PCK7 as shown in FIG. 3B. At this time, the value of the place field of the positional information packet PI is "0x444h" ("0100 0100 0100").

When the number of valid packets is 0, the blank field is usually used, but the transmission frame TF may be constituted of the positional information packet with the value of the place field set at "0h" and null data (dummy data).

Figure 4A:
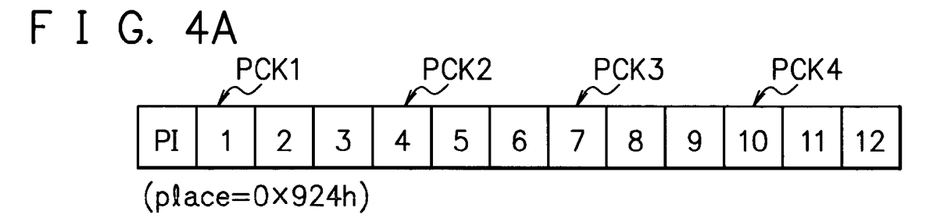
FIGS. 4A to 4C are diagrams showing other data constitution examples at the time of data communication in the embodiment.
Figure 4B:
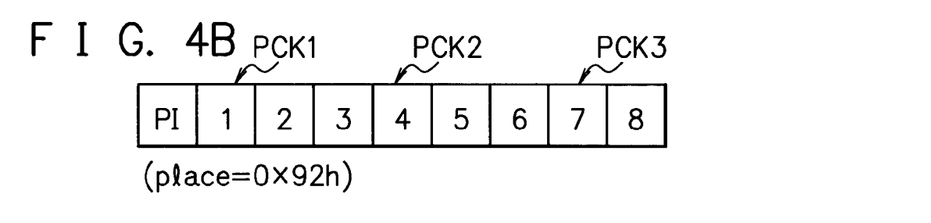
Figure 4C:
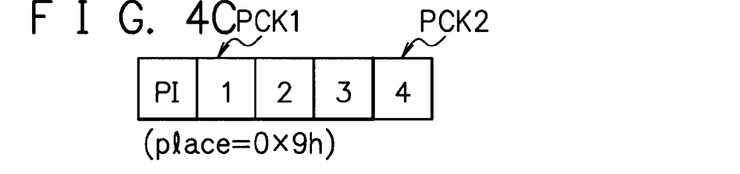

FIGS. 4A to 4C are diagrams showing data constitution examples in the case in which both the valid packets and invalid packets are transferred in data communication. The data constitutions shown in FIGS. 4A to 4C are used when, for example, the transmission line between the transmitting end and the receiving end has a large transmission bandwidth and has a margin, and the like, and the processing of extracting only the valid packets from the bit stream does not become necessary.

FIG. 4A shows a transmission frame transferred from the transmitting end to the receiving end when the position window size is 12 data packets. As shown in FIG. 4A, the transmission frame is constituted of the positional information packet PI and the twelve data packets. For example, the transmission frame corresponding to the time period TSA1 shown in FIG. 1A is constituted of the positional information packet PI with the value of the place field being "0x924h" ("1001 0010 0100"), and twelve data packets in which the valid packets PCK1, PCK2, PCK3 and PCK4 are respectively disposed in the first, fourth, seventh and tenth data packet positions, as shown in FIG. 4A.

Similarly, FIG. 4B shows the transmission frame when the position window size is eight data packets, and the transmission frame is constituted of the positional information packet PI and eight data packets. For example, the transmission frame corresponding to the time period TSB1 shown in FIG. 1B is constituted of the positional information packet PI including "0x92h" ("1001 0010") in the value of the place field, and eight data packets in which the valid packets PCK1, PCK2 and PCK3 are respectively disposed at the first, fourth and seventh data packet positions, as shown in FIG. 4B.

FIG. 4C shows the transmission frame when the position window size is four data packets, and the transmission frame is constituted of the positional information packet PI and four data packets. For example, the transmission frame corresponding to the time period TSC1 shown in FIG. 1C is constituted of the positional information packet PI including "0x9h" ("1001") in the value of the place field, and four data packets in which the valid packets PCK1 and PCK2 are respectively disposed at the first and fourth data packet positions, as shown in FIG. 4C.

Figure 5A:
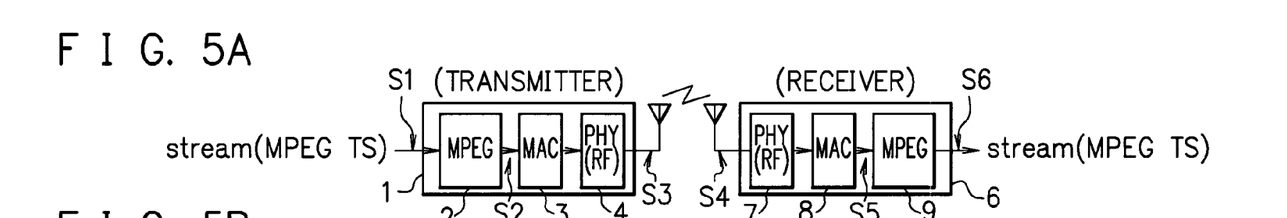
FIGS. 5A and 5B are diagrams showing one example of packet transfer in the embodiment.
Figure 5B:
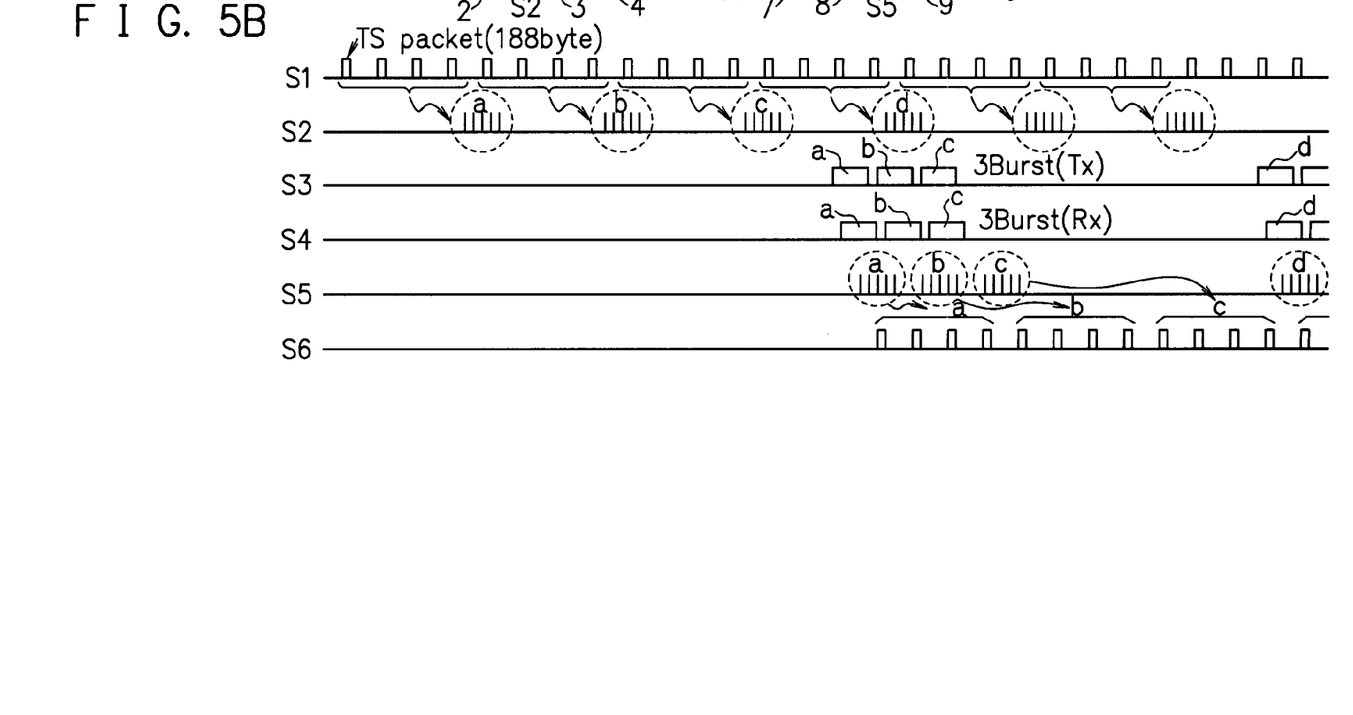

Next, transfer timing and the like when the data packets are transferred to a receiver 6 from a transmitter 1 as shown FIG. 5A are shown in FIG. 5B.

As shown in FIG. 5A, the transmitter 1 has an MPEG processing part 2, an MAC part 3 and a PHY (physical layer) part 4 including an RF part. The transmitter 1 gives the positional information packet (positional information) to the inputted bit stream in the MPEG processing part 2, and transmits them via the MAC part 3 and the PHY part 4 in sequence from an antenna.

The receiver 6 has a PHY part 7 including an RF part, an MAC part 8 and an MPEG processing part 9. The receiver 6 supplies a signal received at an antenna to the MPEG processing part 9 via the PHY part 7 and the MAC part 8 in sequence, then reads out and reproduces the data packets based on the given positional information packet (positional information), and reproduces the bit stream in the same timing as the bit stream inputted into the transmitter 1 and outputs them.

FIG. 5B is a diagram showing one example of packet transfer. In FIG. 5B, S1 is a bit stream inputted into the transmitter 1 (MPEG processing part 2), S2 is an output (transmission frame) of the MPEG processing part 2, and S3 is a transmission signal transmitted from the antenna of the transmitter 1. S4 is a received signal received in the antenna of the receiver 6, S5 is an output of the MAC part 8 (input of the MPEG processing part 9), and S6 is a bit stream which is reproduced and outputted from the receiver 6 (MPEG processing part 2).

In FIG. 5B, the case in which the bit stream S1 that is inputted into the transmitter 1 is the TS packet (188 bytes) of the MPEG, and the size of the position window is of four data packets is explained as one example, but the present invention is not limited to this. For example, the bit stream S1 that is inputted may be of other data packets (for example, a data packet with the packet length of other than 188 bytes), the size of the position window may not be four data packets (for example, eight data packets or twelve data packets).

The bit stream (TS packet) S1, which is decoded by a tuner not shown first, and is outputted in accordance with a reference clock in the tuner, is inputted into the MPEG processing part 2.

The MPEG processing part 2 generates the positional information for each position window (four data packets unit) as described above based on the bit stream S1 which is inputted, and generates the positional information packet PI in conformity to the format shown in FIG. 2. Further, the MPEG processing part 2 generates and outputs the transmission frame (data packet (group) given the positional information) having the data constitution shown in FIGS. 3A, 3B, FIG. 4A, 4B or 4C by using the generated positional information packet PI and the bit stream S1 that is inputted. In the output S2 of the MPEG processing part 2, each of a, b, ... which are encircled by the broken lines is one transmission frame (the same thing applies to the output S5 of the MAC part 8 that will be described later).

In the MAC part 3, the processing of giving the issue numbers showing the transmission sequence and the like is performed for the transmission frames outputted from the MPEG processing part 2, then in the PHY part 4, modulation processing is performed for the transmission frames, and the transmission frames are outputted from the antenna as the transmission signal S3.

When the transmission signal S3 outputted from the antenna of the transmitter 1 is received by the antenna of the receiver 6 as the received signal S4, demodulation processing is performed for the transmission signal S3 in the PHY part 7 and outputted to the MAC part 8. The MAC part 8 performs the processing of reconstruction (permutation of sequence) or the like of the transmission frames in accordance with the issue number given in the transmitter 1, and outputs the transmission frames obtained as the processing result to the MPEG processing part 9.

The transmission frame outputted from the MAC part 8 is temporarily buffered in the MPEG processing part 9. The data packets of the buffered transmission frames are sequentially read out in the MPEG processing part 9 with reference to the given positional information, and are outputted as the bit stream S6. At this time, the MPEG processing part 9 properly performs the processing corresponding to the status information indicated in the state field of the positional information packet PI for the data packets constituting the transmission frames.

The data communication by radio transmission is performed as described above, and the receiver 6 can reproduce the bit stream in the same timing as the bit stream S1 which is inputted into the transmitter 1.

Next, a transmission apparatus according to this embodiment, which performs data transfer by using the positional information, will be explained.

Figure 6:
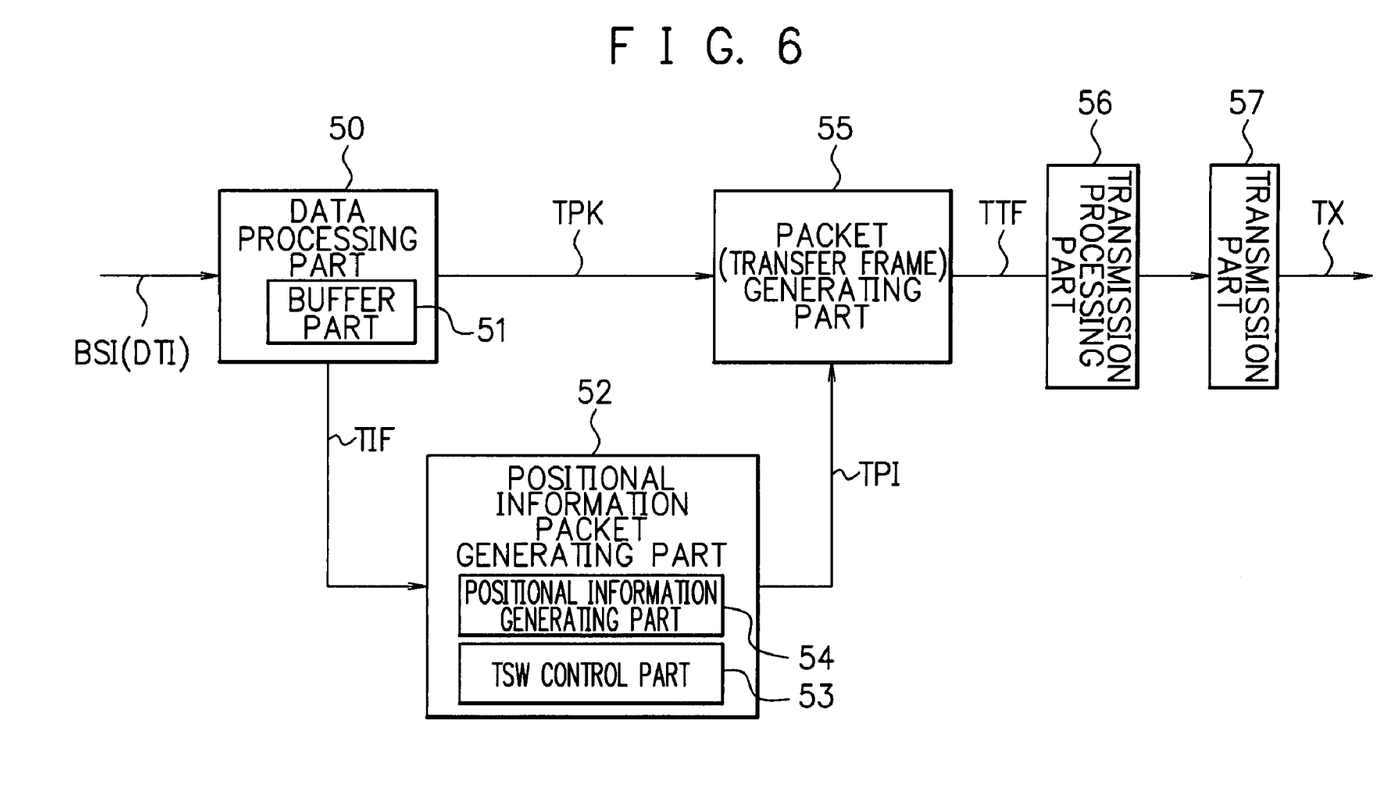
FIG. 6 is a function block diagram showing a constitution example of a transmission apparatus (transmitting end) according to the embodiment.

FIG. 6 is a functional block diagram showing a constitution example of the transmission apparatus (transmitting end) according to this embodiment.

As shown in FIG. 6, the transmission apparatus (transmitting end) has a data processing part 50, a positional information packet generating part 52, a packet (transmission frame) generating part 55, a transmission processing part 56 and a transmission part 57.

The data processing part 50 outputs packet information TIF relating to the valid packets and invalid packets in the inputted bit stream BSI (data packet DTI) to the positional information packet generating part 52. The inputted bit stream BSI (DTI) may be outputted to the positional information packet generating part 52 as the packet information TIF, and it may be determined whether the data packets in the bit stream BSI are valid or invalid in the positional information packet generating part 52. The data processing part 50 has a buffer part 51, and after temporarily storing the inputted bit stream BSI (DTI) in the buffer part 51, the data processing part 50 outputs the bit stream BSI to the packet generating part 55 as the transmission data packet TPK.

The positional information packet generating part 52 generates the positional information packet TPI as shown in FIG. 2 based on the inputted packet information TIF, and outputs this to the packet generating part 55. The positional information packet generating part 52 has a position window (TSW) control part 53 and a positional information generating part 54.

The position window control part 53 controls the size of the position window that is the generation unit of the positional information. The size of the position window can be optionally changed, and it is possible to set the minimum value of one data packet to the maximum value of the maximum possible number of data packets within the range of the communication method and communication protocol which are used, in consideration of retransmission processing and the like. The position window control part 53 may control the size of the position window automatically in accordance with the transmission quality or the like in the data communication, or may control the size of the position window by making the size settable from an outside.

The positional information generating part 54 generates the positional information for each position window specified by the position window control part 53, based on the inputted packet information TIF.

The packet generating part 55 generates the transmission frame TTF of which data constitution is shown in FIG. 3A, 3B, 4A, 4B or 4C by using the positional information packet TPI supplied from the positional information packet generating part 52 and the transmission data packet TPK supplied from the data processing part 55, and outputs the transmission frame TTF to the transmission processing part 56. Namely, the packet generating part 55 gives one positional information packet TPI including the positional information to a plurality of transmission data packets TPK and generates the transmission frame TTF.

The transmission processing part 56 performs predetermined processing such as issue number giving processing for the inputted transmission frame TTF. The transmission part 57 performs modulation processing for the output of the transmission processing part 56, and outputs it as a transmission signal TX.

According to this constitution, the transmission apparatus (transmitting end) shown in FIG. 6 generates one piece of positional information for every plurality of data packets in the position window unit, in the data packets of the bit stream BSI (DTI). The transmission apparatus (transmitting end) generates the transmission frame by giving one piece of positional information packet including the generated positional information to the plurality of data packets, and transmits it by the transmission signal TX.

Figure 7:
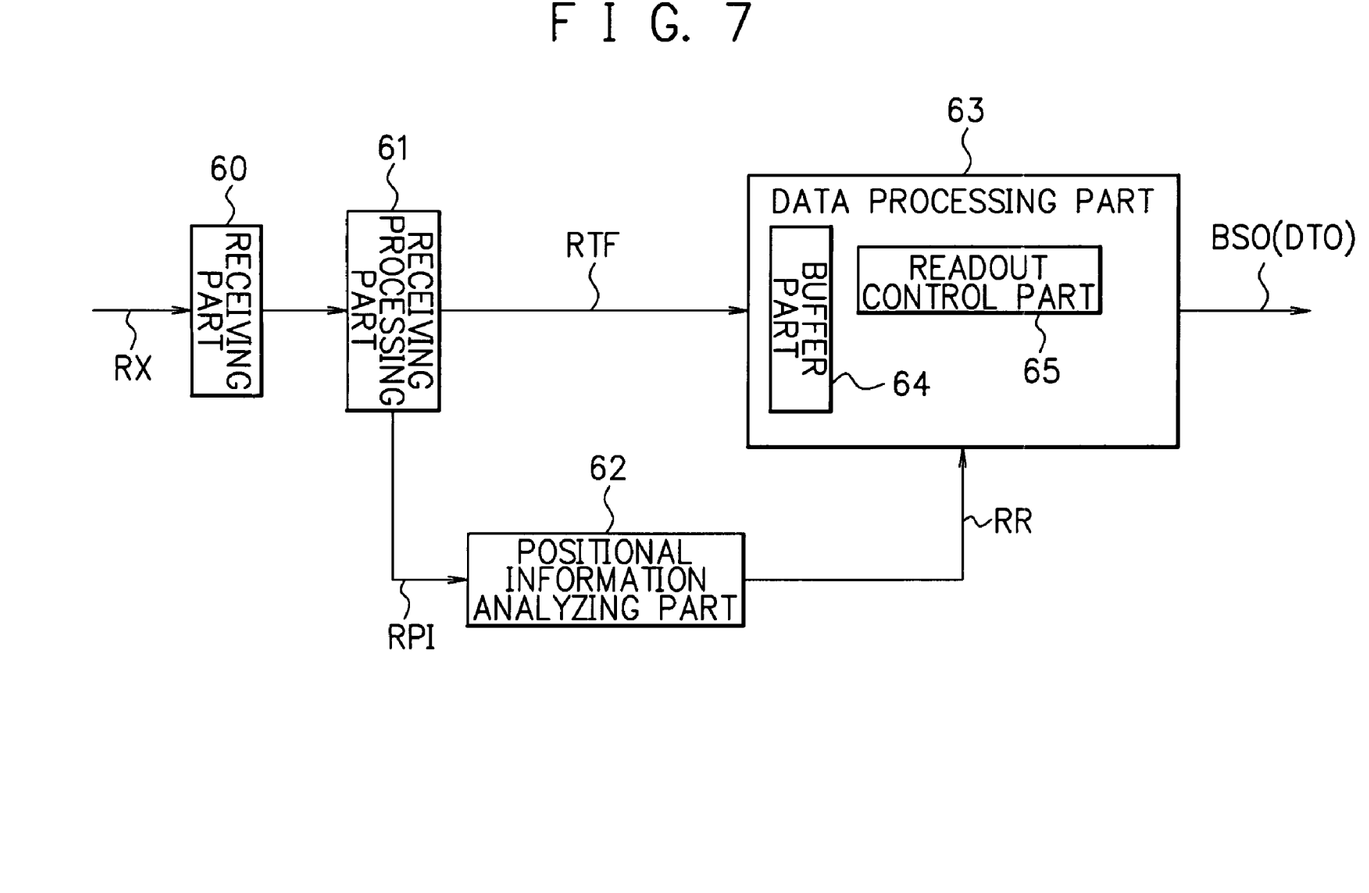
FIG. 7 is a function block diagram showing a constitution example of the transmission apparatus (receiving end) according to the embodiment.

FIG. 7 is a functional block diagram showing a constitution example of the transmission apparatus (receiving end) according to this embodiment.

As shown in FIG. 7, the transmission apparatus (receiving end) has a receiving part 60, a receiving processing part 61, a positional information analyzing part 62 and a data processing part 63.

The receiving part 60 performs demodulation processing for a received signal RX and outputs it to the receiving processing part 61.

The receiving processing part 61 extracts a transmission frame RTF from the demodulated received signal RX outputted from the receiving part 60. At this time, the receiving processing part 61 performs permutation based on the issue number given to the extracted transmission frame. RTF as necessary. The receiving processing part 61 outputs the extracted transmission frame RTF to the data processing part 63, and outputs a positional information packet RPI in the transmission frame RTF to the positional information analyzing part 62.

The positional information analyzing part 62 outputs packet information RR indicating the positions of the valid packets in the position window in the transmission frame RTF to the data processing part 63 based on the inputted positional information packet RPI, more specifically, the positional information included in the positional information packet RPI.

The data processing part 63 has a buffer part 64 and a readout control part 65. The data processing part 63 temporarily holds the data packets in the inputted transmission frame RTF in the buffer part 64. The data processing part 63 reads out the data packets held in the buffer part 64 by the readout control part 65 based on the packet information RR supplied from the positional information analyzing part 62, and outputs the data packets as a bit stream BSO (DTO). When the data packets in the transmission frame RTF are only valid packets, the data processing part 63 properly inserts dummy data (dummy data packets) into the bit stream BSO (DTO) as necessary.

According to this constitution, the transmission apparatus (receiving end) obtains the packet information RR regarding the positions of the valid packets in the position window, based on the positional information in the positional information packet RPI included in the transmission frame RTF obtained by the received signal RX. The transmission apparatus (receiving end) controls readout timing of the data packet based on the obtained packet information RR, reads out the valid packets of the transmission frame RTF and outputs the valid packets as the bit stream BSO (DTO). As a result, the transmission apparatus (receiving end) can reproduce and output the data packets in the same timing as the bit stream BSI (DTI) inputted in the transmitting end.

Figure 8:
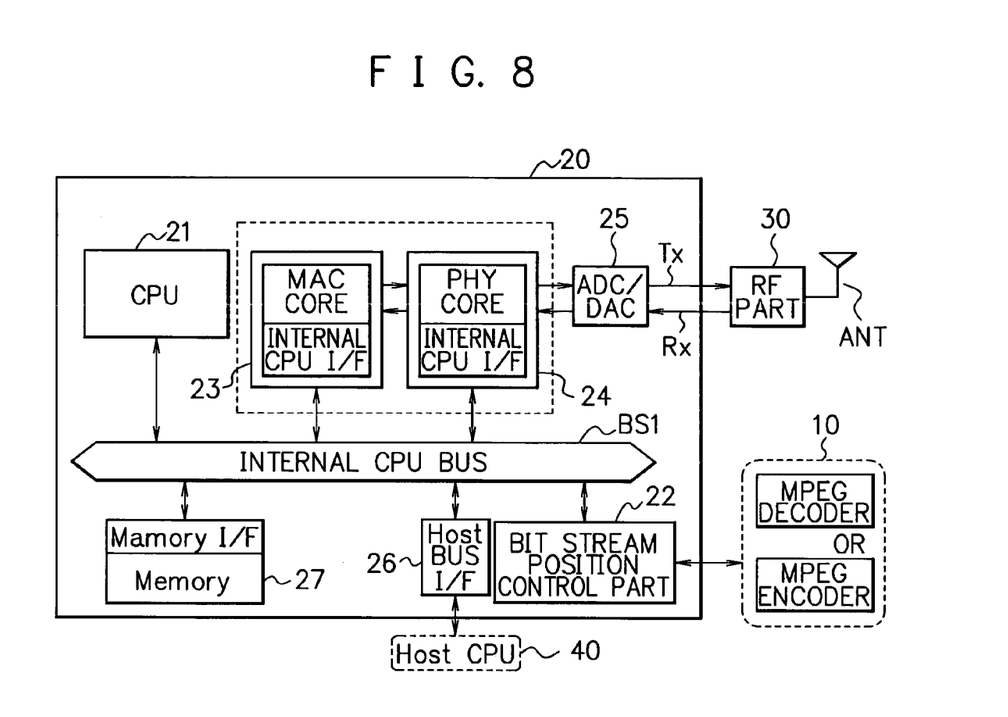
FIG. 8 is a diagram showing a hardware constitution example of the transmission apparatus according to the embodiment.

FIG. 8 is a diagram showing a hardware constitution example of the transmission apparatus according to this embodiment.

In FIG. 8, reference numeral 10 denotes an MPEG decoder or an MPEG encoder, and performs predetermined processing in conformity to the MPEG standards. Reference numeral 30 denotes an RF part, which modulates the transmission signal Tx that is the output of the transmission and reception control part 20 and transmits the signal by an antenna ANT, and demodulates the signal received by the antenna ANT and supplies the signal to the transmission and reception control part 20 as the received signal RX.

The transmission and reception control part 20 performs the processing related to the transmission and reception of the data packets by using the positional information. The transmission and reception control part 20 has an internal CPU 21, a bit stream position control part 22, an MAC part 23, a PHY part 24, an analogue-digital (AD) converter/digital-analogue (DA) converter (ADC/DAC) 25, a host bus interface 26 and a memory part 27.

The internal CPU 21 controls the MAC part 23 based on firmware. The bit stream control part 22 performs the position control of the data packets of the bit stream in accordance with the positional information, and transmission/reception control of the bit stream data.

The MAC part 23 is constituted of an MAC core, and an internal CPU interface for performing communication with the internal CPU 21 via the internal bus BS1. The MAC part 23 controls the MAC function specified by the communication standards together with the firmware executed in the internal CPU 21. Specifically, the MAC part 23 performs a transmission control of the transmission frame at the time of the transmitting operation, and performs a reception control of the received frame at the time of the receiving operation.

The PHY part 24 is constituted of a PHY core, and an internal CPU interface for performing communication with the internal CPU 21 via the internal bus BS1. The PHY part 24 performs a control of a physical layer in the data communication. The PHY part 24 performs generation processing of the frame at the time of the transmitting operation, and performs the extraction processing of the frame at the time of the receiving operation.

The MAC part 23 and the PHY part 24 may be integrally formed as a core block of the IEEE802.11, for example.

The ADC/DAC 25 performs DA conversion and AD conversion related to the transmission signal Tx and the received signal Rx, respectively.

The host bus interface 26 is an interface for performing communication with a host CPU 40 via a host bus not shown. The host bus interface 26 is an interface circuit capable of using either one of the PCI bus interface (3.3V I/F, 32-bit bus, PCI CLK 33 MHz) in conformity to the PCI Rev.2.2, or the general bus interface (data bas 32 bits, address bus 32 bits) for example.

The memory part 27 is constituted of a memory and a memory interface, stores the firmware, and functions as a packet buffer and a firmware operating memory at the time of operation.

In the transmission and reception control part 20, the internal CPU 21, the bit stream position control part 22, the MAC part 23, the PHY part 24, the host bus interface 26 and the memory part 27 are connected to be communicable with each other via the internal bus BS1.

Figure 9:
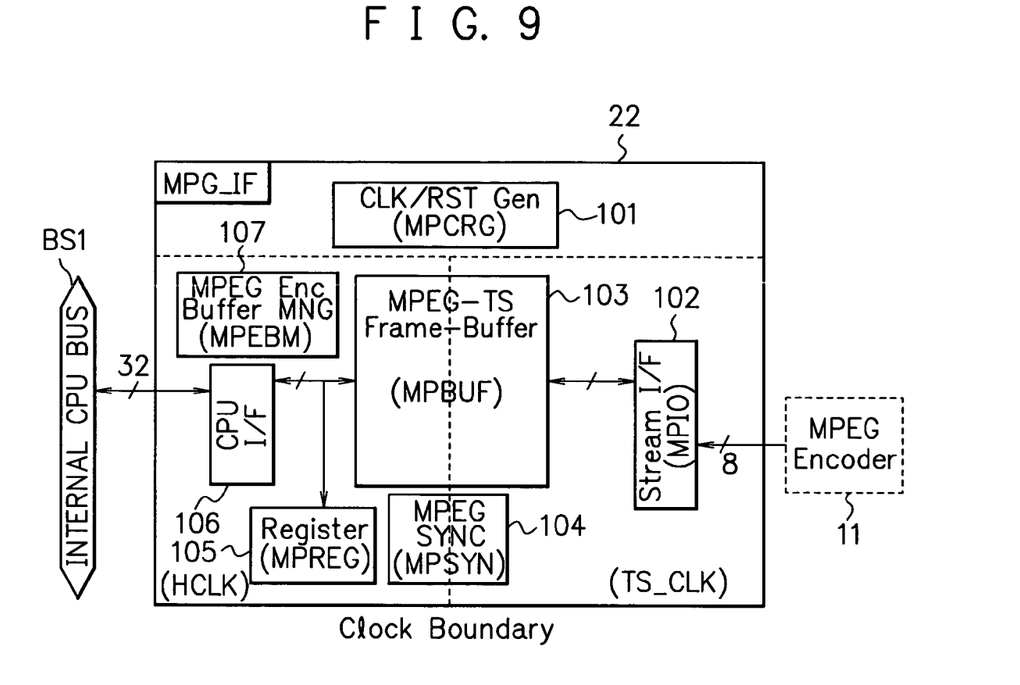
FIG. 9 is a diagram showing a hardware constitution example of a bit stream position control part (transmission end)

FIG. 9 is a diagram showing a hardware constitution example related to the transmitting end function of the bit stream position control part 22 shown in FIG. 8. In FIG. 9, the components and the like having the same functions as the components and the like shown in FIG. 8 are given the same reference numerals and symbols.

As shown in FIG. 9, the bit stream position control part 22 has a clock signal/reset signal generator (MPCRG) 101, a stream interface (MPIO) 102, an MPEG-TS frame-buffer (MPBUF) 103, an MPEG synchronous circuit (MPSYN) 104, a register (MPREG) 105, a CPU interface (CPU I/F) 106, and an MPEG encoder-mode-buffer-management (MPEBM) 107. The MPIO 102, a part of the MPBUF 103, and a part of the MPSYN 104 are operated based on a reference clock signal TS_CLK related to the bit stream. The other part of the MPBUF 103, the other part of the MPSYN 104, the MPREG 105, the CPU I/F 106, and the MPEBM 107 are operated based on a clock signal HCLK conforming to a clock signal of the internal bus BS1.

The MPCRG 101 generates the clock signals TS_CLK and HCLK and a reset signal, and properly supplies the signals to the respective parts in the bit stream position control part 22. The MPIO 102 performs input control of the MPEG-TS packets supplied from the MPEG encoder 11. The MPIO 102 refers to the inputted MPEG-TS packets, and performs extraction of a PID (packet identification data), generation of the positional information and giving of the status information.

The MPBUF 103 is a buffer for temporarily storing the MPEG-TS packets and outputting the MPEG-TS packets. The MPSYN 104 performs synchronization control relating to the function operated by the clock signal TS_CLK and the function operated by the clock signal HCLK. The MPREG 105 stores the register value related to mode setting, control (operation control), status (operation state) and the like.

The CPU I/F 106 is an interface for performing communication via the internal bus BS1, and performs access to the MPREG 105 and transfer of the MPEG-TS packets. The MPEBM 107 performs control processing of the number of MPEG-TS packets stored in the transmission frame, and the like, and controls the output from the MPEG encoder 11 (or a digital TV tuner) via the internal bus BS1.

Figure 10:
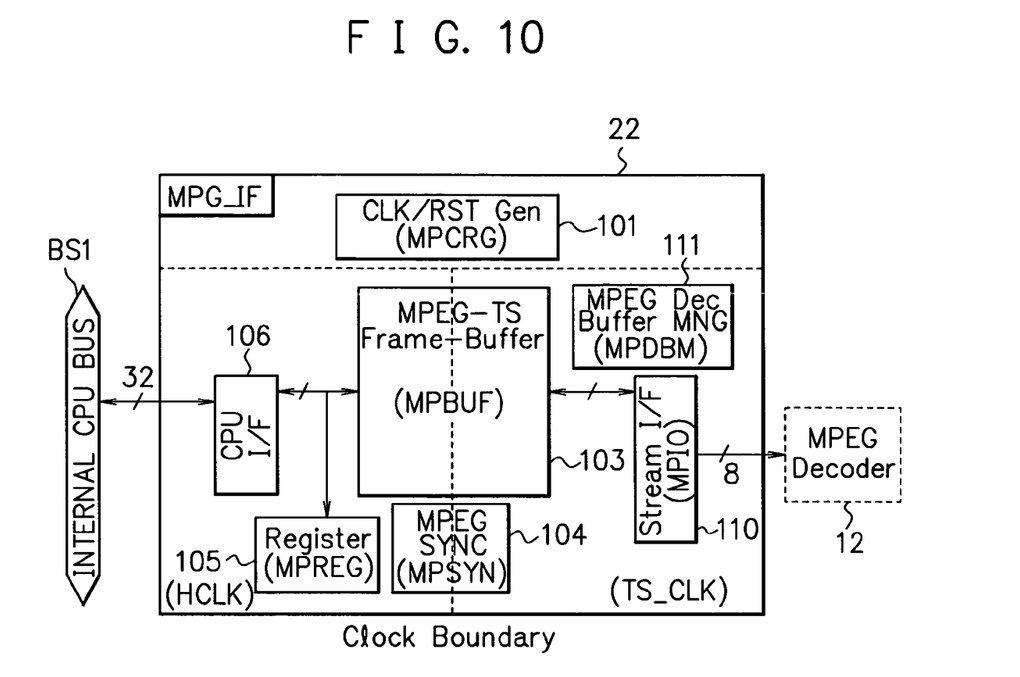
FIG. 10 is a diagram showing a hardware constitution example of the bit stream position control part (receiving end)

FIG. 10 is a diagram showing a constitution example of hardware relating to a receiving end function of the bit stream position control part 22 shown in FIG. 8. In FIG. 10, the components and the like having the same functions as the components and the like shown in FIG. 8 and FIG. 9 are given the same reference numerals and symbols, and the overlapping explanation will be omitted.

The bit stream position control part 22 has the MPCRG 101, the MPBUF 103, the MPSYN 104, the MPREG 105, the CPU I/F 106, a stream interface (MPIO) 110, and an MPEG decoder-mode-buffer-management (MPDBM) 111. A part of the MPBUF 103, a part of the MPSYN 104, the MPIO 110 and the MPDBM 111 are operated based on the clock signal TS_CLK. The other part of the MPBUF 103, the other part of the MPSYN 104, the MPREG 105 and the CPU I/F 106 are operated based on the clock signal HCLK.

The MPIO 110 performs output control of the MPEG-TS packets which are supplied to the MPEG decoder 12. The MPIO 110 notifies the error status information to the MPEG decoder 12 corresponding to the output of the MPEG-TS packets. The MPDBM 111 performs automatic rate control, reproduction control by the positional information, and the like to control the output of the MPEG-TS packets to the MPEG decoder 11.

Figure 11A:
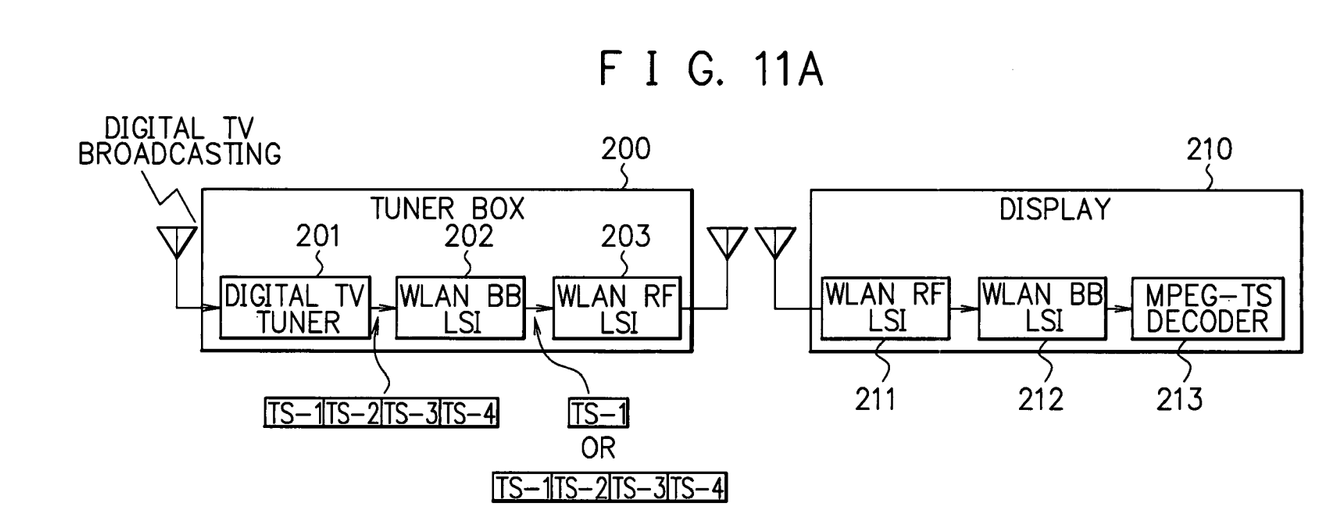
FIGS. 11A and 11B are diagrams showing system constitution examples to which the embodiment is applied.
Figure 11B:
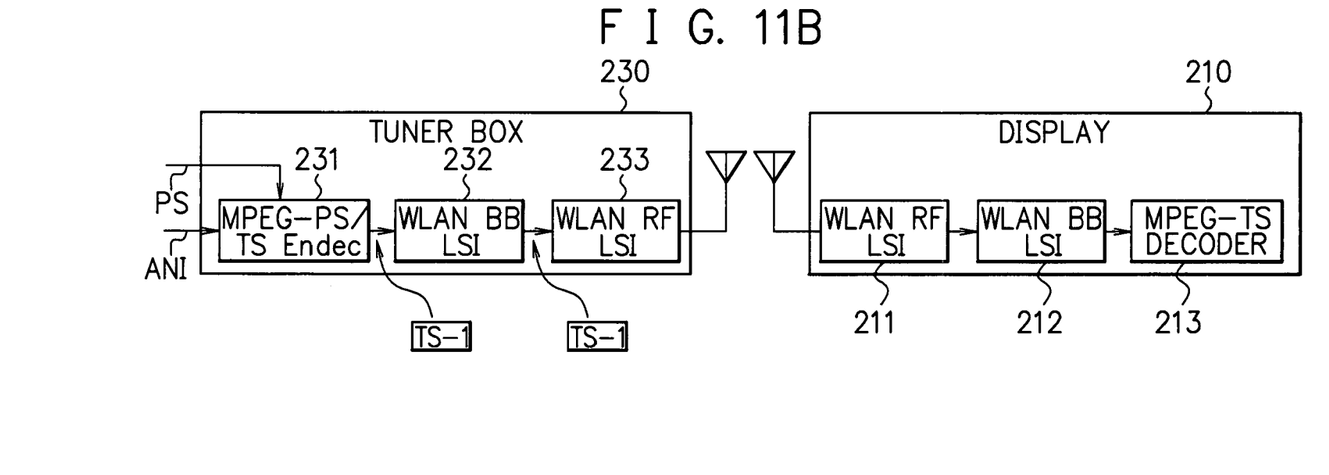

FIGS. 11A and 11B are diagrams showing one example of a system to which the aforementioned embodiment is applied.

FIG. 11A shows an example in which this embodiment is applied to the digital television (TV) broadcasting system, reference numeral 200 denotes a tuner BOX and reference numeral 210 denotes a display.

The tuner BOX 200 has a digital TV tuner 201, a wireless LAN base band processing LSI (WLAN BB LSI) 202, and a wireless LAN modulation processing LSI (WLAN RF LSI) 203. The display 210 has a WLAN RF LSI 211, a WLAN BB LSI 212 and an MPEG-TS decoder 213.

A digital TV broadcasting signal received by the antenna is inputted into the digital TV tuner 201, and the digital TV tuner 201 outputs the MPEG-TS packets which are obtained by applying predetermined decode processing to the digital TV broadcasting signal. The WLAN BB LSI 202 performs processing of giving the positional information (positional information packet) to the MPEG-TS packets supplied from the digital TV tuner 201, and thereafter, outputs the MPEG-TS packets to the WLAN RF LSI 203. The WLAN RF LSI 203 performs modulation processing of the output of the WLAN BB LSI 202, and transmits it to the display 210 from the antenna.

The WLAN RF LSI 211 performs demodulation processing of the signal from the digital TV tuner 201 received by the antenna, and outputs it to the WLN BB LSI 212. The WLAN BB LSI 212 performs reproduction processing of the data packets based on the positional information, which is given as described above, for the signal supplied from the WLAN RF LSI 203. The MPEG-TS decoder 213 performs decode processing of the MPEG-TS packets reproduced by the WLAN BB LSI 212, and outputs the decode result to an output part not shown.

FIG. 11B shows an example in which this embodiment is applied to a system using an analogue television/storage medium (DVD) and the like, and reference numeral 230 denotes a tuner BOX, and reference numeral 210 denotes a display. In the FIG. 11B, the components and the like having the same functions as the components and the like shown in FIG. 11A are given the same reference numerals and symbols, and the overlapping explanation will be omitted.

The tuner BOX 230 has an MPEG-PS/TS encoder-decoder 231, a WLAN BB LSI 232, and a WLAN RF LSI 233.

An analog television signal ANI or the MPEG-PS packets is or are inputted into the MPEG-PS/TS encoder-decoder 231, and the MPEG-PS/TS encoder-decoder 231 outputs the MPEG-TS packets, which are obtained by performing predetermined digital conversion processing such as PS-TS conversion processing and the like for the analog television signal ANI or the MPEG-PS packets. The WLAN BB LSI 232, and the WLAN RF LSI 233 correspond to the WLAN BB LSI 202 and WLAN RF LSI 203, respectively, and the explanation of them will be omitted.

As explained thus far, according to this embodiment, the data packets of the bit stream are expressed by the position, and in the transmitting end, the positional information is generated and given to every plurality of data packets in the inputted bit stream, and they are transmitted. In the receiving end, timing is controlled based on the given positional information, and the received data packets are read out and reproduced.

As a result, by only giving one piece of positional information to a plurality of data packets in the transmitting end, the data packets can be reproduced in the receiving end in the same timing as in the transmitting end, and the overhead is made smaller as compared with the conventional time stamp giving method, as a result of which, a data amount per one data packet is reduced and the transfer efficiency can be enhanced. Since the positional information can be given and the data packet can be reproduced with a plurality of data packets as a unit instead of each data packet as in the conventional time stamp giving method, processing can be carried out at higher speed than in the conventional method which performs processing for each data packet, and reproduction processing is facilitated to make it possible to reduce the circuit scale.

As a result that the size of the position window which is a generation unit of the positional information is made changeable, the positional information can be generated with the suitable position window size with which the optimum transfer processing can be executed corresponding to the transmission quality and the like, and the transfer efficiency can be enhanced.

When only the valid packets are transferred with the positional information packet, the data amount can be reduced by the amount of the invalid packets, and the transfer efficiency is further enhanced.

In the aforementioned embodiment, the case in which the inputted bit stream is of the MPEG-TS packets is explained as one example, but the present invention is not limited to this, and the present invention can be applied to optional packet communication.

In the aforementioned embodiment, the case in which communication between the transmitting end and the receiving end is performed by radio communication is shown as one example, but the present invention is not limited to this, and the present invention is also applicable to the case in which communication between the transmitting end and the receiving end is performed by wire communication.

According to the present invention, only one piece of positional information indicating the positions of the data packets reproduced in the receiving end is given to a plurality of data packets in the bit stream inputted into the transmitting end, and the reproducing timing is controlled based on the positional information, whereby the data packets can be reproduced in the receiving end in the same timing as in the transmitting end. Accordingly, even if the time intervals of the data packets, which are reproduced in the receiving end in the bit stream inputted into the transmitting end, do not have the fixed periods, it is suitable if only one piece of positional information is given to a plurality of data packets, and therefore the overhead becomes smaller as compared with the conventional time stamp giving method which gives the time stamp to each data packet, thus making it possible to enhance the transfer efficiency.

The positional information giving processing and the data packet reproduction processing are performed with a plurality of data packets as a unit instead of each data packet, it is made possible to increase the processing speed and reduce the circuit scale.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A transmission apparatus for performing transfer of data by packet communication from a transmitter to a receiver, which reproduces the data packets in a same timing as in the transmitter, wherein:
    positional information is generated with a plurality of data packets as one unit, said positional information indicating positions of data packets, to be reproduced in a receiving end among data packets in an inputted bit stream, and one positional information packet having the generated positional information is given to the plurality of data packets, and the plurality of data packets with the one positional information packet are transmitted,
    wherein a number of data packets, set to be a generation unit of the positional information, is changeable, and
    wherein the positional information packet further has size information indicating the number of data packets set to be the generation unit of the one positional information.

2. The transmission apparatus according to claim 1, wherein the number of data packets set to be the generation unit of the one positional information is discretely changeable, and the size information is a code indicating the number of data packets.

3. The transmission apparatus according to claim 1, wherein the positional information is constituted of bits arranged corresponding to each data packet of the plurality of data packets, and indicates by a binary numeral whether each data packet is a data packet to be reproduced or not.

4. The transmission apparatus according to claim 1, wherein only specific selected data packets in the plurality of data packets and a control data packet are transmitted with the one positional information packet.

5. The transmission apparatus according to claim 1, wherein the one positional information packet further has status information related to each of the data packets.

6. The transmission apparatus according to claim 5, wherein the status information is constituted of bits arranged corresponding to each data packet of the plurality of data packets, and indicates, by a binary numeral, whether each data packet has a fault, or not.

7. The transmission apparatus according to claim 1, wherein the one positional information packet further has blank information indicating intervals between the data packets to be reproduced in the receiving end.

8. The transmission apparatus according to claim 7, wherein the blank information is set when the intervals between the data packets to be reproduced in the receiving end exceed a threshold value, and the threshold value is changeable.

9. The transmission apparatus according to claim 1, wherein an issue number, indicating a transmission sequence, is given to each transmission frame constituted of the one positional information packet and the data packets, and the transmission frame with the issue number is transmitted.

10. The transmission apparatus according to claim 1, wherein the one positional information packet and the data packets are transmitted by at least one of radio communication and wire communication.

11. A transmission apparatus performing transfer of data by packet communication, wherein:
    a positional information packet having positional information indicating positions of data packets to be reproduced for every plurality of data packets in a bit stream, and data packets transmitted with the positional information packet are received, and reproduction timings of the received data packets are controlled based on the one positional information included in the received positional information packet,
    wherein a number of data packets, set to be a generation unit of the positional information, is changeable, and
    wherein the positional information packet further has size information indicating the number of data packets set to be the generation unit of the one positional information.

12. The transmission apparatus according to claim 11, wherein:
    the positional information is constituted of a plurality of bits arranged corresponding to the position of each data packet in the plurality of data packets, and respectively indicating whether the data packets are the data packets to be reproduced, or not, in a binary numeral, and
    in accordance with the value of the each bit, the data packet corresponding to the bit is reproduced.

13. A transmission apparatus, comprising:
    a positional information packet generating part generating a positional information packet having time positional information indicating positions of data packets to be reproduced in a receiving end with a plurality of data packets in an inputted bit stream as one unit;
    a transmission frame generating part generating a transmission frame comprising one positional information packet, generated in said positional information packet generating part, and the data packets; and a transmission part transmitting the transmission frame, wherein a number of data packets, set to be a generation unit of the positional information, is changeable, and wherein the positional information packet further has size information indicating the number of data packets set to be the generation unit of the one positional information.

14. The transmission apparatus according to claim 13, wherein said positional information packet generating part has a positional information generating part generating the one positional information based on the timing of the data packets in the inputted bit stream.

15. The transmission apparatus according to claim 14, wherein the size control part controls the number of data packets set to be the generation unit of the positional information corresponding to transmission quality related to transmission of the transmission frame.

16. The transmission apparatus according to claim 13, further comprising:

a transmission processing part giving an issue number indicating transmission sequence to each transmission frame generated in said transmission frame generating part.

17. A transmission apparatus, comprising:

a receiving part receiving a transmission frame comprising one positional information packet having positional information indicating positions of data packets to be reproduced for a plurality of data packets in a bit stream, and plural data packets;

a positional information analyzing part analyzing the one positional information included in the received positional information packet; and a readout control part controlling reproducing timings of the received plural data packets based on analyzing results in said positional information analyzing part, wherein a number of data packets, set to be a generation unit of the positional information, is changeable, and wherein the positional information packet further has size information indicating the number of data packets set to be the generation unit of the one positional information.

18. A transmission method for performing transfer of data by packet communication, comprising:

generating positional information indicating positions of data packets to be reproduced in a receiving end among data packets in an inputted bit stream with a plurality of the data packets as one unit; and giving one positional information packet having the positional information generated in said positional information generating to the plurality of data packets and transmitting the plurality of data packets with the one positional information packet, wherein a number of data packets, set to be a generation unit of the positional information, is changeable, and wherein the positional information packet further has size information indicating the number of data packets set to be the generation unit of the one positional information.

19. A transmission method for performing transfer of data by packet communication, comprising:

receiving a positional information packet having positional information indicating timing positions of data packets to be reproduced for a plurality of data packets in a bit stream, and data packets transmitted with the positional information packet; and controlling reproducing timings based on the positional information included in the received positional information packet and reproducing the received data packets wherein a number of data packets, set to be a generation unit of the positional information, is changeable, and wherein the positional information packet further has size information indicating the number of data packets set to be the generation unit of the one positional information.

* * * * *